(12) United States Patent
Hobraiche et al.

(10) Patent No.: US 7,400,102 B2
(45) Date of Patent: Jul. 15, 2008

(54) METHOD FOR CONTROLLING A POLYPHASE VOLTAGE INVERTER

(75) Inventors: Julien Hobraiche, Compiegne (FR); Jean-Paul Vilain, Melicocq (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 240 days.

(21) Appl. No.: 11/474,327

(22) Filed: Jun. 26, 2006

(65) Prior Publication Data
US 2007/0025130 A1  Feb. 1, 2007

(30) Foreign Application Priority Data
Jul. 29, 2005   (FR) .................................. 05 08189

(51) Int. Cl.
*H02K 23/00* (2006.01)
(52) U.S. Cl. ........................ 318/254; 318/138; 363/37
(58) Field of Classification Search ................ 318/138, 318/254, 439, 721, 799, 811, 806; 363/37, 363/41, 97, 98, 132, 136, 159
See application file for complete search history.

(56) References Cited

U.S. PATENT DOCUMENTS

| | | | | |
|---|---|---|---|---|
| 4,648,022 A | * | 3/1987 | Schauder | 363/159 |
| 5,010,291 A | * | 4/1991 | Edwards | 323/222 |
| 5,111,374 A | * | 5/1992 | Lai et al. | 363/37 |
| 6,118,680 A | * | 9/2000 | Wallace et al. | 363/71 |
| 6,362,590 B2 | * | 3/2002 | Nozari | 318/609 |
| 6,876,176 B2 | * | 4/2005 | Stefanovic et al. | 322/20 |

FOREIGN PATENT DOCUMENTS

| | | |
|---|---|---|
| JP | 56 058781 A | 5/1981 |
| JP | 61 154483 A | 7/1986 |
| JP | 61 258677 A | 11/1986 |

* cited by examiner

*Primary Examiner*—Rajnikant B Patel
(74) *Attorney, Agent, or Firm*—Berenato, White & Stavish

(57) ABSTRACT

The present invention relates to a method for controlling a polyphase voltage inverter the inverter being designed to control a load in terms of pulse width modulation and to be connected upstream to a voltage source via a DC bus and downstream to an electrical load. It is connected to a control logic which implements said method. A geometric structure is produced while taking account of the constraints downstream and upstream of the inverter. More particularly, an upstream constraint relates to the voltage of the supply source at the input of the inverter. An error vector is also produced.

13 Claims, 6 Drawing Sheets

METHOD FOR CONTROLLING A POLYPHASE VOLTAGE INVERTER

FIELD OF THE INVENTION

The invention relates to a method for controlling a polyphase voltage inverter. The present invention is used with particular advantage, but not exclusively, in the automotive sector, the aeronautics sector and the industrial sector.

One aim of the invention is to stabilize the voltage upstream of the inverter so as to reduce the size of the decoupling capacitor.

Another aim of the invention is to retain control of the polyphase load downstream of the inverter while reducing the losses in the inverter.

It also relates to a device which carries out said method for controlling a polyphase voltage inverter.

BACKGROUND OF THE INVENTION

At present, polyphase voltage inverters are used to drive polyphase electrical loads. These electrical loads are for example reversible machines such as starter-alternators. The polyphase voltage inverter is a DC/AC converter. It is connected upstream to a DC supply source and connected downstream to the phase windings of the load. The inverter is supplied with power by the DC supply source. It is controlled in terms of pulse width modulation by a control logic.

The inverter comprises a number of bridge arms, each comprising for example two static switches equipped with free-wheel diodes, i.e. two levels. The mid-point of each pair of switches of one and the same bridge arm is connected to a phase winding of the load. The control logic makes it possible to control the switches of one and the same bridge arm so as to avoid short-circuiting the supply source, for example by controlling them in a complementary manner.

A number of techniques exist for controlling the polyphase inverter, in particular voltage control of the load or current control of the load. To stabilize the voltage, on the upstream side of the inverter, according to the known control techniques, the inverter comprises a decoupling capacitor upstream. This decoupling capacitor makes it possible to filter the current entering the inverter, said current being subject to considerable discontinuities. This decoupling capacitor has a high capacitance so as to keep the input voltage of the inverter constant and to avoid any oscillation effects. The physical size of the decoupling capacitor is very large. Such a decoupling capacitor poses size problems when used in a restricted space.

In order to reduce the physical size of the decoupling capacitor, use is currently being made of capacitors with a high volume capacitance, such as electrochemical capacitors. However, these capacitors exhibit a lack of reliability, particularly in high-temperature or humid environments.

Moreover, the manufacture of these decoupling capacitors requires the use of expensive technologies on account of the demanding specifications. This expensive technology increases the overall cost of the polyphase inverter.

The control techniques mentioned above therefore do not make it possible to stabilize the voltage of the upstream part of the inverter.

SUMMARY OF THE INVENTION

The object of the present invention is to overcome these problems concerning expensive technology, size, reliability and stabilization of the voltage of the upstream part of the inverter, so as to reduce the size of the decoupling capacitor. To do this, the invention proposes a method for controlling the polyphase voltage inverter which makes it possible to limit the ripples in the voltage of the DC supply source while controlling the polyphase electrical load when the filtering capacitance used does not provide sufficient voltage inertia to make the DC voltage constant. Moreover, this method makes it possible to minimize the losses in the polyphase voltage inverter.

In other words, the control techniques of the invention control what happens upstream in addition to what happens downstream. These control techniques make it possible to control the ripples in the voltage of the DC supply source when the decoupling capacitor is of low capacitance.

To do this, a spatial structure is produced, taking account of the constraints downstream and upstream of the inverter. More particularly, one upstream constraint concerns the voltage of the supply source at the input of the inverter. An error vector is also produced. Thus, an attempt is made to keep this error vector within the spatial structure by selecting a control vector for the inverter which is able to correct the error. This selection is made according to different criteria, depending on the variants. This correction is carried out according to a predictive or hysteretic strategy and depending on whether it is desired for example to rapidly correct the error or to make the time until the appearance of the next error as long as possible.

More specifically, the invention relates to a method for controlling a voltage inverter, the inverter being designed to control a load in terms of pulse width modulation and to be connected upstream to a voltage source via a DC bus and downstream to an electrical load. According to the invention, the method comprises the following steps:

measuring the source voltage at an input of the inverter, comparing the measurement of the source voltage with a setpoint voltage, deducting this comparison from an instantaneous source voltage error, selecting a control vector for the inverter so as to keep the instantaneous source voltage error within a predetermined range, and applying the control vector to the inverter.

According to non-limiting embodiments, the method according to the invention may comprise one or more of the following features:

the predetermined range is symmetrical and is centred on zero.

to produce the control of the inverter, the method comprises the following steps if the instantaneous source voltage error leaves the predetermined range:

implementing a predictive strategy based on a predetermined model of the impedance of the DC bus, comprising the following steps:

comparing the model of the impedance of the DC bus with the possible control vectors, selecting the control vector which makes it possible to bring the instantaneous source voltage error back into a predetermined range.

the method comprises steps for predictive vectorial current control, including the following steps:

measuring the phase currents of the polyphase load, determining a current vector in the load from said current measurements, calculating a vectorial current error with respect to a setpoint current vector, if the vectorial current error leaves a predetermined geometric structure, then the method comprises the following steps:
comparing the possible control vectors with a model of the load,
selecting a control vector which brings the vectorial current error back into the predetermined geometric structure.
the method comprises steps for vectorial voltage control, including the following steps:
measuring the output voltages of the inverter,
determining a voltage vector with respect to a setpoint vector,
calculating a voltage error vector,
transforming the voltage error vector,
if the transformation of the voltage error vector leaves a predetermined geometric structure, then the method comprises the following steps:
comparing the possible control vectors with the corresponding evolution of the transform of the corresponding error vector,
selecting a control vector which brings the vectorial voltage error transformation back into the predetermined geometric structure.
the transformation is a time integral.
the predetermined geometric structure comprises at least two dimensions.
to produce the control of the inverter, the method comprises the following steps if the instantaneous source voltage error leaves the predetermined range:
implementing a hysteretic strategy comprising the following steps:
selecting a control vector which makes it possible, when applied, to create a current stage at the input of the inverter which corrects the direction of variation of the source voltage.
knowing the predetermined range and the instantaneous source voltage error, where source voltage error=measured voltage minus setpoint voltage, then
if the source voltage error is greater than or equal to the upper limit of the predetermined range, then the method selects a control vector which makes it possible to increase the current,
if the source voltage error is less than or equal to the lower limit of the predetermined range, then the method selects a control vector which makes it possible to reduce the current.
the method comprises steps for hysteretic current control, including the following steps:
calculating, for each phase current, a current error,
comparing the current error with a hysteresis,
the result of the comparison with the hysteresis then being the control for the corresponding phase,
the result of the selection which aims to keep the instantaneous voltage error within the predetermined range taking priority over the result of the comparison with the hysteresis.
the selection step comprises a step of checking convergence which checks the evolution of the error, if this evolution is, with the current control vector, in the direction of correcting the error, then the control vector remains unchanged.
if a number of control vectors are eligible, the method selects by way of priority the one which minimizes the number of switching operations in the inverter, then the one which maximizes the time until the next error appears.

The invention also relates to a device for carrying out said method. According to one particular feature, the device comprises a voltage inverter which is connected upstream to a DC bus, downstream to an electrical load and also connected to a control logic, the control logic implementing the method of the invention briefly described above and producing control vectors for the inverter.

BRIEF DESCRIPTION OF THE DRAWINGS

The invention will be better understood on reading the following description and on examining the accompanying figures. The latter are given purely by way of example and are not intended to limit the invention in any way. In the figures.

DESCRIPTION OF THE PREFERRED EMBODIMENTS

Figure 1:
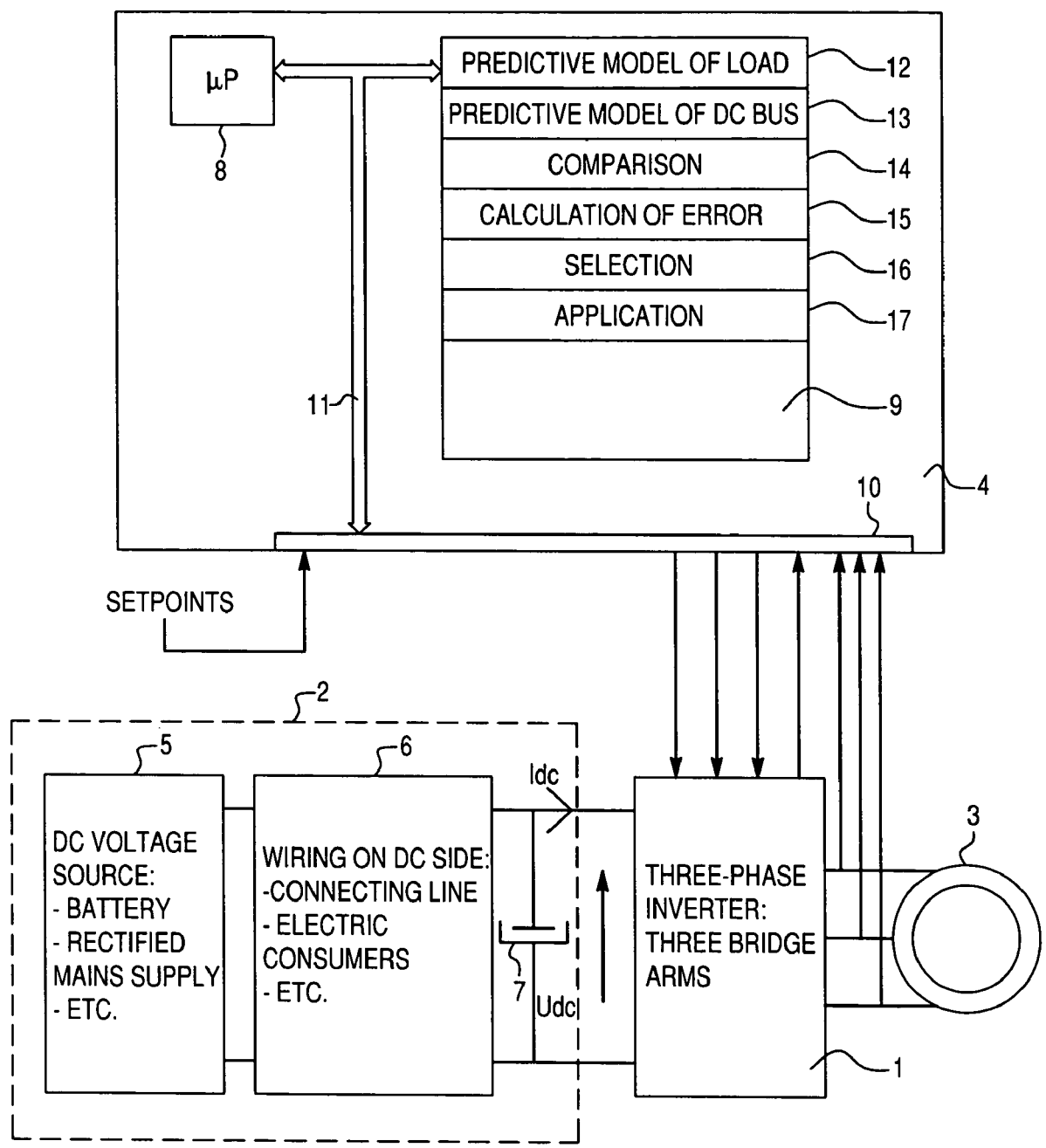
FIG. 1 shows means for implementing the method according to the invention.

FIG. 1 shows a polyphase inverter 1 connected upstream to a DC bus 2, downstream to a polyphase load 3 and controlled by control vectors produced by a control logic 4. The inverter 1 is an electrical device which is designed to convert a DC voltage into a number of sinusoidal voltages, one per phase. The inverter 1 comprises a number of bridge arms (not shown). Each bridge arm comprises a number of switches which can be controlled electronically.

For the rest of the description, just one three-phase inverter with two levels is described, knowing that it can be replaced by other existing types of inverter. The inverter 1 is therefore a three-phase inverter which controls the load 3. It thus comprises three bridge arms. Each bridge arm comprises two bidirectional current switches equipped with free-wheel diodes.

The DC bus 2 comprises a DC voltage source 5. In one preferred example, this DC voltage source 5 is a battery or a rectified mains supply. This voltage source 5 supplies power to the load 3 via the inverter 1. In the example of FIG. 1, devices 6, which are in particular connecting lines and electric consumers, are connected in series and in parallel respectively to the voltage source 5. These electric consumers may be, inter alia, in the case of a motor vehicle, headlamps, a radio or an air-conditioning system, this list not being exhaustive.

The DC bus 2 also comprises a decoupling capacitor 7 which is connected in parallel with the voltage source 5. This capacitor 7 is preferably located close to the inverter 1. The capacitor 7 is of low capacitance. The capacitance of the capacitor 7 is preferably reduced by 25% compared to the capacitances of the decoupling capacitors of the prior art. In one preferred embodiment, the capacitance of the capacitor 7 is around 500 microfarads for a parasitic inductance of the connecting line of around 10 microHenrys and for a 36 V, 18 milliOhms battery. The role of the capacitor 7 is to filter the source current entering the inverter 1. The capacitor 7 supplies the rippled part of the source current and allows the voltage source 5 to deliver only the mean value of said source current to the inverter 1.

The equipment combining the DC bus 2 and the inverter 1 is designed to supply the power needed to operate the load 3. The inverter 1 is used to drive the load 3. The load 3 may be an induction motor or asynchronous motor. The mid-point of each pair of switches of one and the same bridge arm of the inverter 1 is connected to a phase of the load 3.

The inverter 1 is controlled in terms of pulse width modulation by the control logic 4. To control a polyphase inverter, the control logic 4 defines the open or closed state of all of the switches of the inverter. The control logic 4 makes it possible to control the switches of one and the same bridge arm in a complementary manner. The antagonism of controlling the switches of one and the same bridge arm and the finite number of switches means that the number of possible configurations for the switches of the bridge arms is finite.

For the three-phase inverter with two levels, it is possible to generate eight different configurations of the switches of the bridge arms. Each of these eight configurations can be associated with a vectorial representation of the output voltages of the inverter, which will be called control vectors of the inverter. These control vectors are commonly referred to as output vectors of the inverter.

The control vector is a mathematical representation which shows the resultant value of the actual voltages applied to the load 3. Among these configurations, six are active states V1 to V6 corresponding to a fixed amplitude of the control vector and distinguished by the phase, and two V0 and V7 are "freewheel" states for which the amplitude of the control vector is zero and its phase ($\phi$=arc tangent y/x) is not defined. The control vector produced by the control logic 4 comprises at least as many control modes as the load 3 comprises phases. In the case of the assumed example of a three-phase inverter with two levels, controlled in a complementary manner, there are three control modes.

The control vectors produced by the control logic 4 can be represented in a stator-based representation. The stator-based representation is a representation with fixed axes ($\alpha$, $\beta$) associated with the stator. The axis $\alpha$ is horizontal and the axis $\beta$ is vertical.

The control logic 4 is often embodied in the form of an integrated circuit. In one example, this control logic 4 comprises a microprocessor 8, a program memory 9 and an input/output interface 10. The microprocessor 8, the memory 9 and the input/output interface 10 are interconnected by a bus 11.

In practice, when an action is assigned to a device, said action is carried out by a microprocessor of the device which is controlled by code instructions stored in a program memory of the device. The control logic 4 is such a device.

The program memory 9 is divided into a number of zones, each zone corresponding to code instructions for carrying out a function of the device. The memory 9 comprises, depending on the variants of the invention, a zone 13 comprising code instructions for implementing a predictive model of the DC bus 2. The memory 9 comprises a zone 12 comprising code instructions for implementing a predictive model of the load 3. The memory 9 comprises a zone 14 comprising code instructions for determining a difference between the source voltage and a voltage setpoint. The memory 9 comprises a zone 15 comprising code instructions for determining an error. The memory 9 comprises a zone 16 comprising code instructions for selecting a control vector for the inverter. The memory 9 comprises a zone 17 comprising code instructions for applying the selected control vector to the inverter.

Figure 2:
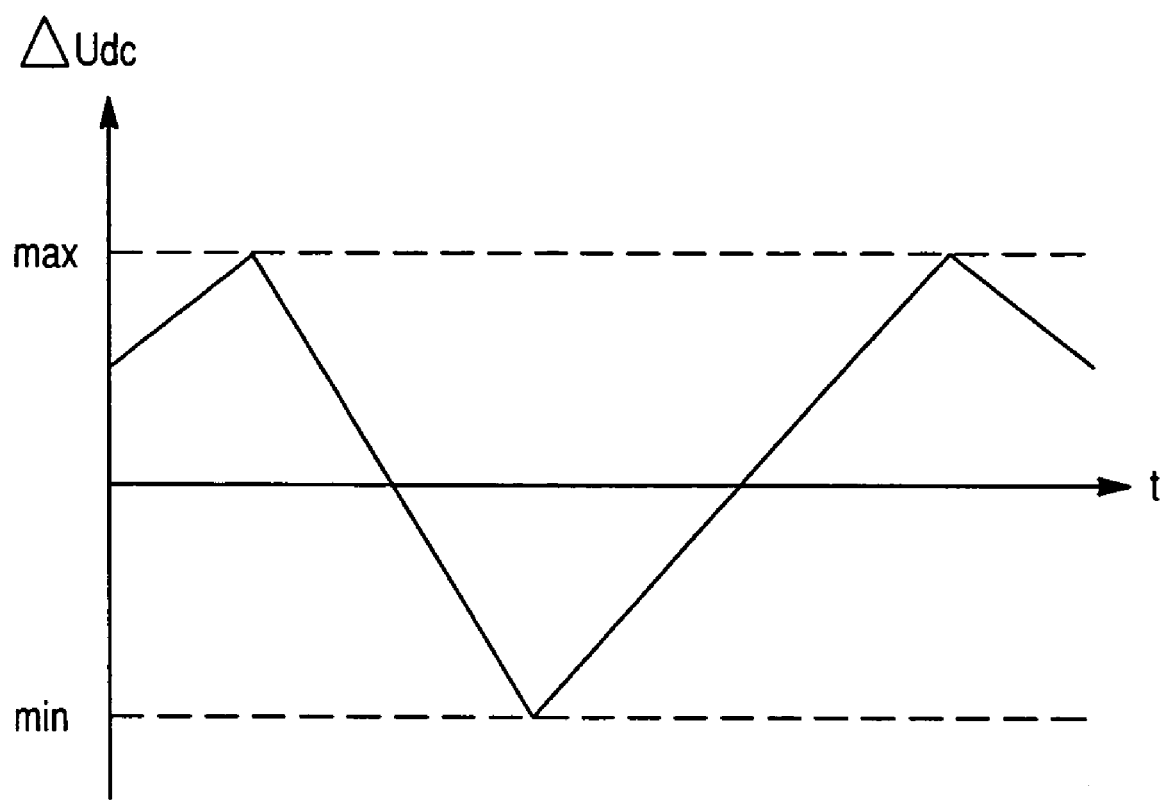
FIG. 2 shows an adjustment of the source voltage error within a predetermined range, according to the method of the invention.

FIG. 2 shows the adjustment of the source voltage. In the example of FIG. 2, the control logic 4 produces a predetermined range [min, max]. In one preferred example, the predetermined range is symmetrical and is centred on zero, for example [−1V, +1V]. It will be noted that this range may also be open.

The control logic 4 receives on the interface 10 a setpoint source voltage $U^*_{DC}$. This setpoint source voltage $U^*_{DC}$ is preferably a filtered value of a measurement of the source voltage. It may also be an estimate of the source voltage, for example using a state reconstructor of the Kalman or Luenberger type. This filtered value or this estimate makes it possible to limit the ripples in the voltage around a mean of the source voltage.

The control logic 4 acquires the measurement of the source voltage $U_{DC}$. The control logic 4 may acquire this measurement of the source voltage $U_{DC}$, which is also the voltage of the DC bus, by measuring said voltage close to the inverter 1. It may also acquire the measurement of the source voltage $U_{DC}$ by estimates or by indirect measurements.

The control logic 4 calculates the instantaneous source voltage error $\Delta U_{DC}$. In one example, $\Delta U_{DC}$ is the difference between the source voltage $U_{DC}$ and the setpoint voltage $U^*_{DC}$. The instantaneous source voltage error $\Delta U_{DC}$ is kept within the predetermined range [min, max] by the control logic 4; otherwise control of the load could be lost. To this end, the control logic selects a control vector for which the source voltage $U_{DC}$ is as close as possible to the setpoint voltage value $U^*_{DC}$. It applies this selected control vector to the inverter.

In one example, the adjustment of the source voltage $U_{DC}$ can be carried out by two methods. In a first method, the source voltage $U_{DC}$ is adjusted according to a predictive strategy. And in a second method, the source voltage $U_{DC}$ is adjusted according to a hysteretic strategy.

These two methods can be coupled with all the existing types of control for the inverter. In this way, the upstream part is controlled using the predictive or hysteretic strategy and the downstream part is controlled using the existing types of control for the inverter.

Predictive Strategy

In the first method of adjusting the source voltage $U_{DC}$, the control logic 4 uses a predictive strategy. The predictive strategy is based on a predetermined model of the impedance of the DC bus. This predetermined model of the impedance of the DC bus represents the predictive model for the DC bus.

In the case where the instantaneous source voltage error $\Delta U_{pc}$ leaves the predetermined range [min, max], the control logic 4 compares the model of the DC bus with the possible control vectors. Based on this comparison, it selects the control vector which makes it possible to bring the error back into the predetermined range. The model of the DC bus therefore makes it possible to simulate the response of the DC bus to a given control vector. This simulation makes it possible to test the various possible control vectors so as to select the one that best corresponds to a predetermined criterion.

Adjustment of the source voltage using the predictive strategy is designed to provide for evolution of the voltage $U_{DC}$ at the time when switching of the switches of the bridge arms of the inverter has to be carried out, so as to select the best possible switching operation.

This strategy for the source voltage makes it possible to control the rippling of the source voltage when the decoupling capacitance is of low value. It will be noted that, with low-value capacitances, given the slightest parasitic inductance, a resonant circuit appears upstream of the inverter, which leads to ripples in the voltage of the supply source. These ripples may cause the irreversible destruction of the switches of the inverter by exceeding the permitted inverse voltage at the terminals thereof. This disrupts the power supply to any electric consumers, in particular the headlamps in the case of a motor vehicle, which are connected in parallel on the voltage source.

Hysteretic Strategy

In the second method of adjusting the source voltage, the control logic 4 uses a hysteretic strategy. In the case where the instantaneous source voltage error $\Delta U_{DC}$ leaves the predetermined range, the control logic 4 selects a control vector which makes it possible, when applied to the inverter 1, to create a current stage at the input of the inverter 1 which corrects the direction of variation of the source voltage $U_{DC}$. If the instantaneous source voltage error $\Delta U_{DC}$ is greater than the max of the predetermined range, then the control logic 4 imposes a positive source current stage which causes a break in the slope that is sufficient for the source voltage to change its direction of evolution. Likewise, if the instantaneous source voltage error $\Delta U_{DC}$ is lower than the min of the predetermined range, then the control logic 4 imposes a negative source current stage.

The hysteretic strategy makes it possible not to need to know the predictive model of the DC bus, this model being difficult to obtain since it requires the measurement of parasitic elements, i.e. of very low values.

This strategy is robust with respect to the variation of the parameters of the DC bus, i.e. it does not depend in a consequential manner on the variation of said parameters.

Furthermore, the algorithm of this strategy is simple and quick to carry out.

Finally, this strategy can be carried out in an analogue or digital manner.

Coupling of Predictive Strategy and Predictive Current or Voltage Control

Figure 3:
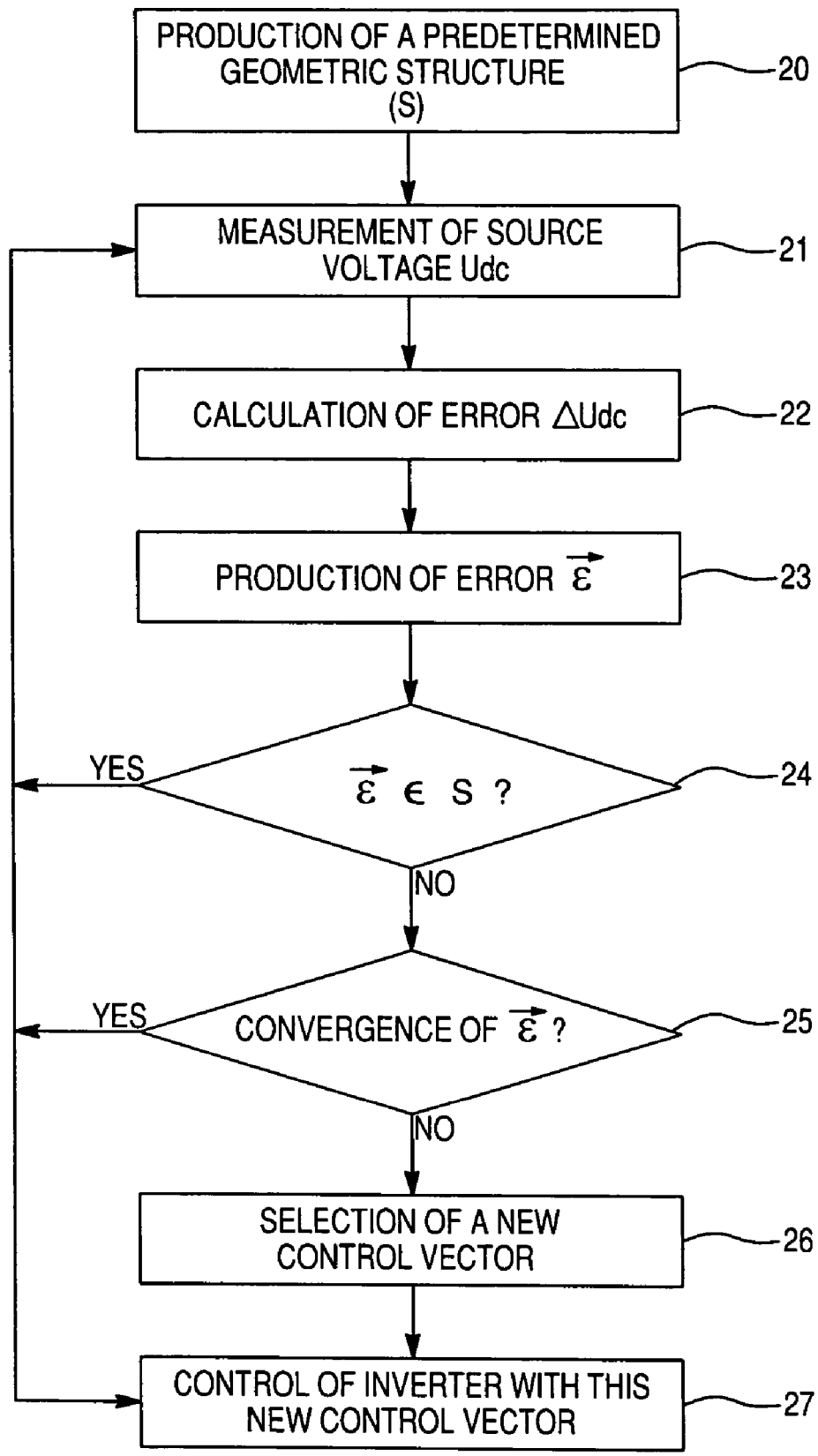
FIG. 3 shows the steps for coupling a predictive strategy with existing control techniques for the inverter, according to the method of the invention.

FIG. 3 shows one embodiment of the invention in which the predictive strategy is coupled with predictive current control of the load 3 or with vectorial voltage control of the load 3 so as to have both upstream and downstream control of the inverter 1. In the example of FIG. 3, the control logic 4 produces a predetermined geometric structure in step 20. In order to determine this predetermined geometric structure, the control logic 4 produces in step 20 a first part of the geometric structure (required for downstream control) and a second part of this geometric structure which is the predetermined range [min, max] (required for upstream control). The production of the first part of the geometric structure depends on the control mode for the load 3.

In the case of predictive current control of the load 3, the inverter 1 controls the load 3 in terms of current. The control logic 4 acquires the measurements of the currents of each phase of the load 3. The control logic 4 can acquire these measurements either by carrying out measurements in the phases of the load 3 or by making estimates or carrying out indirect measurements.

The set of phase currents can be represented by a current vector $\vec{I}$ in the stator-based representation. The control logic 4 receives at the interface 10 a setpoint current vector $\vec{I}^*$. The control logic 4 calculates the vectorial current error. In one example, the vectorial current error ($\Delta Ix$, $\Delta Iy$) is the difference between the current vector $\vec{I}$ and the setpoint current vector $\vec{I}^*$. In order for the current control of the load to be optimal, it is necessary that the vectorial current error is as low as possible. The vectorial current error is then assigned to a planar domain, by the control logic 4. This planar domain is the first part of the predetermined geometric structure produced by the control logic 4 in step 20. In one preferred embodiment, this planar domain is a disc. This makes it possible to easily detect any departures from the planar domain.

Knowing the polyphase electrical load 3 and the measurements on the latter makes it possible for the control logic 4 to draw up a predictive model of evolution of the vectorial current vector as a function of the control vectors of the inverter.

If the vectorial current error leaves the disc, the control logic 4 compares possible control vectors with a model of the load 3. Based on this comparison, the control logic 4 selects the control vector which brings the vectorial current error back inside the disc.

In the case of vectorial voltage control of the load 3, the inverter 1 controls the load 3 in terms of voltage. The control logic 4 acquires the measurements of the voltages of each phase of the load 3. The control logic 4 can acquire these measurements either by carrying out measurements in the phases of the load 3 or by making estimates or carrying out indirect measurements. The set of phase voltages can be represented by a voltage vector in the stator-based representation.

The control logic 4 receives at the interface 10 a setpoint voltage vector $\vec{V}^*$. The control logic 4 calculates the vectorial voltage error. In one example, the vectorial voltage error is the difference between the setpoint voltage vector $\vec{V}^*$ and the voltage vector $\vec{V}$. In order for the voltage control of the load to be optimal so as to control it effectively, it is necessary that the mean standard value of the vectorial voltage error is as low as possible.

Since the values taken by the voltage vector are discrete, the vectorial voltage error cannot be cancelled instantaneously. The control logic 4 then carries out a transformation of the vectorial voltage error which can, for its part, be cancelled.

In one preferred embodiment, the control logic can cancel, in terms of mean value, the vectorial voltage error. In one example, the cancelling of the mean value of the vectorial voltage error is obtained by a time integral of said vectorial voltage error. In other words, the transformation of the vectorial voltage error is a time integral of the vectorial voltage error.

In order that the vectorial voltage control of the load 3 is of good quality, that is to say optimal, it is necessary that the time integral of the vectorial voltage error is as low as possible. The control logic 4 then assigns the integral vector of the vectorial voltage error to a planar domain, i.e. keeps it inside this planar domain. This planar domain is the first part of the predetermined geometric structure produced by the control logic 4 in step 20. In one preferred embodiment, this planar domain is a disc.

If the integral of the vectorial voltage error leaves the disc, the control logic 4 compares possible control vectors with the corresponding evolution of the transform of the corresponding error vector. The control logic 4 selects a control vector which brings the integral of the vectorial voltage error back inside the disc. The vector is selected according to an example of embodiment shown in FIG. 5, which example will be described in more detail further below in the description.

In general, the predetermined geometric structure comprises at least two dimensions, regardless of the number of phases of the load 3. In the example taken here, there are three phases, and the geometric structure has two dimensions since it is a disc.

After determination of the predetermined geometric structure by the control logic 4 in step 20, the control logic 4 measures or estimates the source voltage $U_{DC}$ in step 21. In step 22, the control logic 4 calculates the instantaneous source voltage error $\Delta U_{DC}$ as a function of the setpoint voltage $U^*_{DC}$. This instantaneous source voltage error $\Delta U_{DC}$ is the difference between the source voltage $U_{DC}$ and the setpoint voltage $U^*_{DC}$.

The control logic 4 must keep on the one hand the vectorial current error inside a disc, in the case of current control, or the integral of the vectorial voltage error inside a disc, in the case of voltage control, and on the other hand must keep the instantaneous source voltage error $\Delta U_{DC}$ within the predetermined range by means of a predictive strategy.

To do this, the control logic 4 defines, in step 23, an error vector $\vec{\epsilon}$ which represents the concatenation of the vectorial current error ($\Delta Ix$, $\Delta Iy$) (downstream control) or of the integral of the vectorial voltage error and of the source voltage error $\Delta U_{DC}$ (upstream control). The aim of the strategy is therefore to define the state of the switches of the polyphase inverter so that the error vector $\vec{\epsilon}$ (($\Delta Ix$, $\Delta Iy$, $\Delta U_{DC}$) permanently remains within the predetermined geometric structure. This predetermined geometric structure is a volume. This volume represents the first part of the predetermined geometric structure and the predetermined range. In the case where the first part of the predetermined geometric structure is a disc, the space domain of the error vector $\vec{\epsilon}$ is a cylinder.

In general, the first part of the predetermined geometric structure comprises at least two dimensions, regardless of the number of phases of the load 3. In the example taken here, there are three phases, and the first part of the geometric structure has two dimensions since it is a disc. Furthermore, the coupling of the dimensions of the first part of the geometric structure to the dimension of the instantaneous source voltage error extends this structure to an additional dimension. In the example of FIG. 3, the predetermined geometric structure produced in step 20 is therefore a cylinder, that is to say a structure with three dimensions.

With the two predictive models, predictive in terms of current or predictive in terms of voltage, the control logic 4 is capable at any moment of estimating the trajectory of the error vector $\vec{\epsilon}$ in space. The control logic 4 can therefore determine in an optimal manner the control vector for the inverter which makes it possible to keep the error within the cylinder.

In step 24, the control logic 4 permanently scrutinizes the error vector $\vec{\epsilon}$ to see whether it is inside the cylinder. If it is outside the cylinder, then the control logic 4 determines, in step 25, whether the error vector $\vec{\epsilon}$ is converging towards the cylinder. In the case where the error vector $\vec{\epsilon}$ is converging towards the cylinder, the control logic 4 keeps the same control vector for the inverter 1. If the error vector $\vec{\epsilon}$ is not converging towards the cylinder, the control logic 4 selects, in step 26, a new control vector which brings the error vector $\vec{\epsilon}$ back into the cylinder. The criteria for selecting the new control vector, in step 26, are described in FIG. 5. In step 27, the control logic 4 controls the inverter 1 with this new control vector.

Thus, such a coupling makes it possible to minimize the average switching frequency of the switches for a given volume of the geometric structure, so that there are less switching losses and therefore the stress on the power components is reduced.

Figure 5:
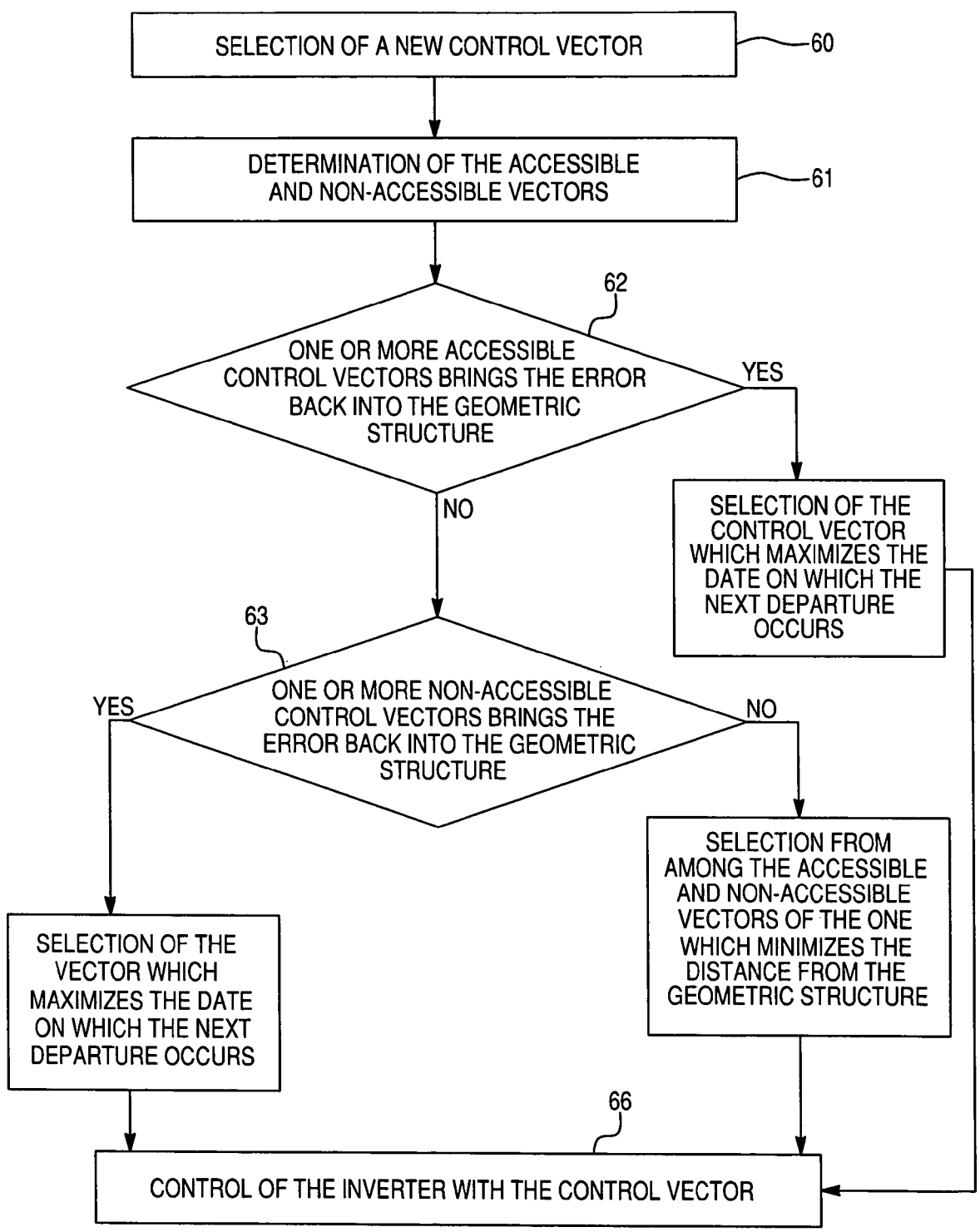
FIG. 5 shows the steps for selecting a control vector, according to the method of the invention.

FIG. 5 shows the various steps in selecting a control vector for the predictive strategies. A preliminary step 60 in which the control logic 4 selects a new control vector. For this, the control logic 4 determines in step 61 the accessible control vectors and the non-accessible control vectors of the bridge arms of the inverter 1. The accessible control vectors are the control vectors which require just a single switching operation on a single bridge arm with respect to the current state of the inverter 1. The non-accessible control vectors are the rest of the control vectors.

In step 62, the control logic 4 determines among the accessible control vectors the ones which bring the error back into its geometric structure. It then determines among these control vectors the one which maximizes the time taken until the next error appears.

The control logic 4 controls the inverter with this accessible control vector.

If none of the accessible control vectors bring the error back into its geometric structure, the control logic 4 checks in step 63 whether one of the non-accessible control vectors brings the error back into its geometric structure. It then determines among these control vectors the one which maximizes the time taken until the next error appears, so as to reduce the switching losses in the inverter.

It is also possible to provide the control vector which comes closest to the centre of the geometric structure, so as to assist the precision of the predictive control.

The control logic 4 controls the inverter with this non-accessible control vector.

If none of the accessible or non-accessible control vectors brings the error back into its geometric structure, the control logic 4 can select the control vector as follows:

the control vector which minimizes the distance from the geometric structure.

Of course, it is also possible if desired to again find the difference between the accessible vectors and the non-accessible vectors in this case.

Coupling of Hysteretic Strategy and Hysteretic Current Control

Figure 4:
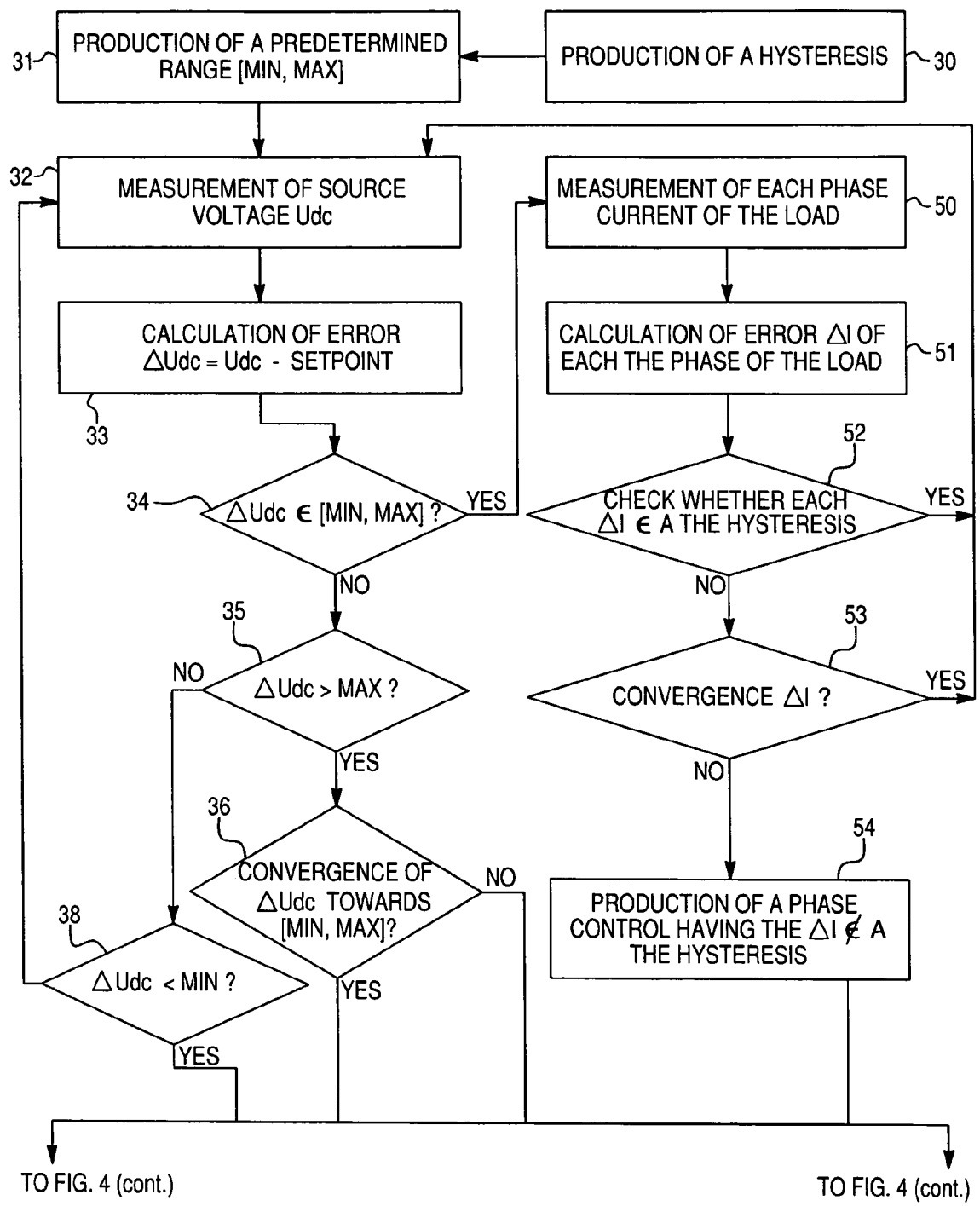
FIG. 4 shows the steps for coupling a hysteretic strategy with an existing control technique for the inverter, according to the method of the invention.
Figure 4:
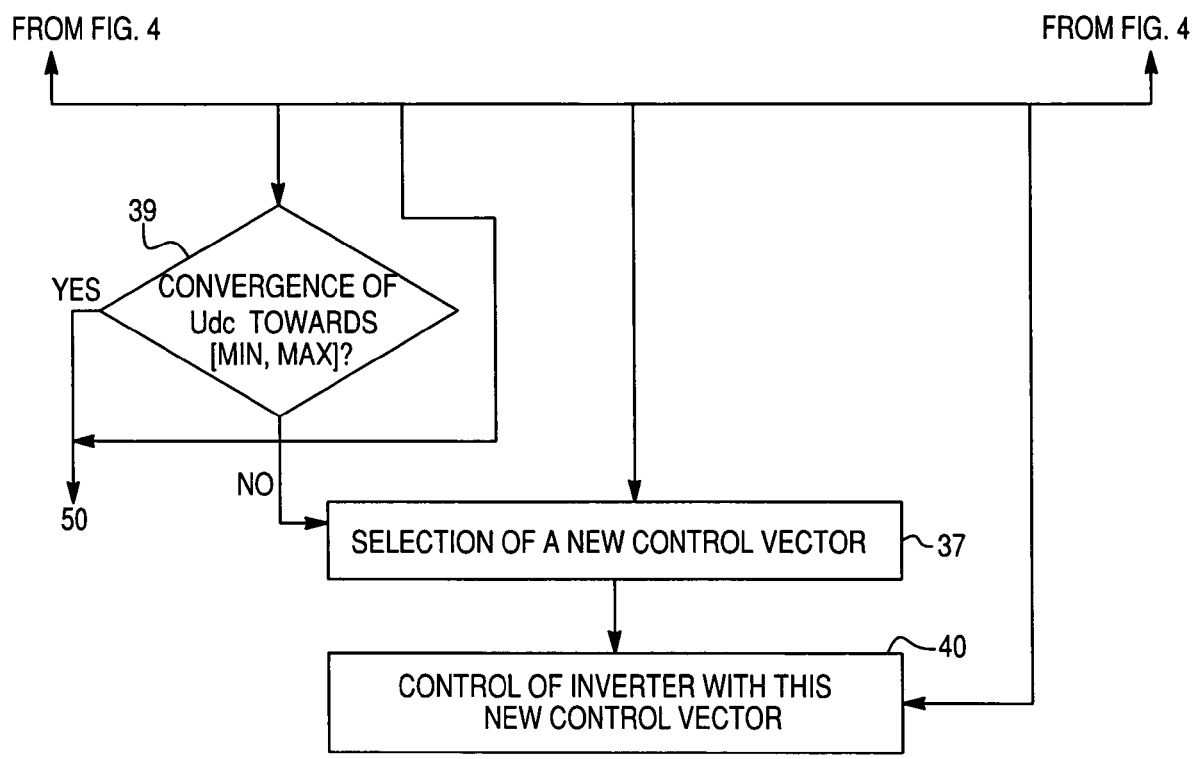

FIG. 4 shows another embodiment in which the hysteretic strategy is coupled with current control of the load 3 so as to have both upstream and downstream control of the inverter 1. In the case of current control of the load 3, the inverter 1 controls the polyphase electrical load 3 in terms of current. In the example of FIG. 3, the control logic 4 produces a hysteresis in step 30.

The hysteresis makes it possible to compare a scalar current error of each phase of the load 3 with two predefined and different current error thresholds. Producing a hysteresis therefore comes down to producing a range [$\delta H1$, $\delta H2$]. The hysteresis defines a current error threshold $\delta H1$ for which it produces at its output a phase control (here at +$U_{DC}$). It also defines a current error threshold $\delta H2$ for which it stops the production of the phase control (here at 0).

In step 31, the control logic 4 produces the predetermined range [min, max]. It measures or estimates the source voltage $U_{DC}$, in step 32. In step 33, the control logic 4 calculates the instantaneous source voltage error $\Delta U_{DC}$ as a function of the setpoint voltage $U^*_{DC}$. In step 34, the control logic 4 permanently scrutinizes the instantaneous source voltage error $\Delta U_{DC}$ to check whether it is within the predetermined range. If the instantaneous source voltage error $\Delta U_{DC}$ is within the predetermined range, the control logic 4 applies step 50. If the instantaneous source voltage error $\Delta U_{DC}$ is outside the predetermined range, the control logic 4 applies step 35.

Step 50 corresponds to control of the load 3, downstream of the inverter 1. Step 35 corresponds to control of the source voltage, upstream of the inverter. In the example of FIG. 4, the control of the upstream part of the inverter takes priority over the control of the downstream part of the inverter. In other words, the result of the selection which aims to keep the instantaneous source voltage error $\Delta U_{DC}$ within the predetermined range takes priority over the output of the hysteresis. This is because, if control is lost upstream, control is also lost downstream, i.e. if the necessary voltage is not available upstream, it is impossible to apply the necessary currents downstream.

In step 35, the control logic 4 checks whether the instantaneous source voltage error $\Delta U_{DC}$ is greater than or equal to the max of the predetermined range. If this is the case, the control logic 4 determines in step 36 the convergence of the instantaneous source voltage error $\Delta U_{DC}$ towards the predetermined range. If the instantaneous source voltage error $\Delta U_{DC}$ is converging towards the predetermined range, the control logic 4 keeps the same control vector.

If the instantaneous source voltage error $\Delta U_{DC}$ is not converging towards the predetermined range, the control logic 4 selects, in step 37, a new control vector, as described above, which brings the instantaneous source voltage error $\Delta U_{DC}$ back into the predetermined range.

If the instantaneous source voltage error $\Delta U_{DC}$ is less than max, in step 35, then the control logic 4 checks, in step 38, whether the instantaneous source voltage error $\Delta U_{DC}$ is less than or equal to min of the predetermined range. If this is the case, the control logic 4 determines, in step 39, the convergence of the instantaneous source voltage error $\Delta U_{DC}$ towards the predetermined range. If the instantaneous source voltage error $\Delta U_{DC}$ is converging towards the predetermined range, the control logic 4 keeps the same control vector.

If the instantaneous source voltage error $\Delta U_{DC}$ is not converging towards the predetermined range, the control logic 4 selects, in step 37, a new control vector which brings the instantaneous source voltage error $\Delta U_{DC}$ back into the predetermined range.

In step 50, the control logic 4 measures or estimates the currents of each phase of the load 3. The control logic 4 receives at the interface 10 a setpoint current. The control logic 4 calculates the current error of each phase of the load 3, in step 51. In one example, the current error is equal to the difference between the phase current and the setpoint current.

In step 52, the control logic 4 compares each current error of each phase of the load 3 with the hysteresis. The hysteresis produces at its output a phase control for each of the phases of the load 3. These phase controls determine the state of each bridge arm of the corresponding inverter.

In other words, the current control of the load defines the state of a bridge arm of the polyphase inverter as a function of the phase current error in the latter. Depending on this error in the corresponding arm, a selection is made to change the control vector according to the hysteresis principle.

The number of output states of the hysteresis is equal to the number of output levels of the polyphase inverter being controlled.

If the current error of a bridge arm is outside the hysteresis, the control logic 4 determines, in step 53, the convergence of the current error with respect to the hysteresis. If the current error of said bridge arm is converging towards the hysteresis, the control logic 4 keeps the control which controls this bridge arm. This applies in respect of all the bridge arms of the inverter.

If the current error of a bridge arm is not converging towards the hysteresis, the control logic 4 produces a new phase control, in step 54, for this bridge arm. This applies in respect of all the bridge arms of the inverter, to give a hysteresis per arm and therefore per phase of the load 3.

In step 40, the control logic 4 controls the inverter 1 with this new control vector.

Variant Embodiment

It is possible to control the load 3 using a variant of the hysteretic strategy coupled with current control of the load. This variant is used when the load is isolated, i.e. the neutral point of the phases of the load is not connected to any potential. In fact, when the load is isolated, it is found that one of the hystereses for controlling the corresponding phases is redundant. This is because, in this case, the sum of the phase currents is always equal to 0. Thus, at any given time, one of the bridge arms is no longer actually able to be current-controlled.

For current control of the load, the control logic 4 modifies the mode of operation of the hysteresis. The control logic 4 carries out current control by comparing the errors of each phase of the load with the hysteresis, on N-1 bridge arms. It carries out voltage control on the remaining bridge arm. N is the number of phases of the load 3. There are as many phases as there are bridge arms.

In one preferred embodiment, the control logic 4 carries out voltage control on the bridge arm with the greatest phase current, by locking the latter. Locking of a bridge arm means keeping said bridge arm in a given state. In other words, the states of the switches on said bridge arm do not change.

The control logic 4 makes it possible to alternately switch all of the bridge arms of the inverter. The gain is to no longer switch the bridge arms when the current in the latter is at a maximum, and thus to reduce the losses caused by switching of the switches.

Depending on the phase shift between the current vector $\vec{I}$ and the setpoint voltage vector $\vec{V}^*$, it is sometimes impossible to lock the bridge arm with the greatest phase current. In this case, the control logic 4 locks the bridge arm with the second-greatest phase current. If the latter cannot be locked, the control logic 4 locks the bridge arm with the third-greatest phase current, and so on.

Therefore, one advantage of coupling to an isolated load is that of reducing switching losses in an optimal manner.

Thus, the advantages of hysteretic coupling with hysteretic control of the load 3, which may or may not be isolated, are:
- an algorithm which is simple and quick to carry out and which can therefore be easily integrated in an on-board signal processor,
- robustness with respect to variations of the parameters of the load.

What is claimed is:

1. Method for controlling a voltage inverter, the inverter being designed to control a load in terms of pulse width modulation and to be connected upstream to a voltage source via a DC bus and downstream to an electrical load, wherein the method comprises the following steps:
measuring the source voltage at an input of the inverter,
comparing the measurement of the source voltage with a setpoint voltage,
deducting this comparison from an instantaneous source voltage error, selecting a control vector for the inverter so as to keep the instantaneous source voltage error within a predetermined range, and applying the control vector to the inverter.

2. Method according to claim 1, wherein the predetermined range is symmetrical and is centred on zero.

3. Method according to claim 1, wherein to produce the control of the inverter, the method comprises the following steps if the instantaneous source voltage error leaves the predetermined range:

implementing a predictive strategy based on a predetermined model of the impedance of the DC bus, comprising the following steps:

comparing the model of the impedance of the DC bus with the possible control vectors, selecting the control vector which makes it possible to bring the instantaneous source voltage error back into a predetermined range.

4. Method according to claim 1, which comprises steps for predictive vectorial current control, including the following steps:

measuring the phase currents of the polyphase load, determining a current vector in the load from said current measurements, calculating a vectorial current error with respect to a setpoint current vector, if the vectorial current error leaves a predetermined geometric structure, then the method comprises the following steps:

comparing the possible control vectors with a model of the load, selecting a control vector which brings the vectorial current error back into the predetermined geometric structure.

5. Method according to claim 1, which comprises steps for vectorial voltage control, including the following steps:

measuring the output voltages of the inverter, determining a voltage vector with respect to a setpoint vector, calculating a voltage error vector, transforming the voltage error vector, if the transformation of the voltage error vector leaves a predetermined geometric structure, then the method comprises the following steps:

comparing the possible control vectors with the corresponding evolution of the transform of the corresponding error vector, selecting a control vector which brings the vectorial voltage error transformation back into the predetermined geometric structure.

6. Method according to claim 5, wherein the transformation is a time integral.

7. Method according to claim 3, wherein the predetermined geometric structure comprises at least two dimensions.

8. Method according to claim 1, wherein to produce the control of the inverter, the method comprises the following steps if the instantaneous source voltage error leaves the predetermined range:

implementing a hysteretic strategy comprising the following steps:

selecting a control vector which makes it possible, when applied, to create a current stage at the input of the inverter which corrects the direction of variation of the source voltage.

9. Method according to claim 8, wherein knowing the predetermined range and the instantaneous source voltage error, where source voltage error measured voltage minus setpoint voltage, then if the source voltage error is greater than or equal to the upper limit of the predetermined range, then the method selects a control vector which makes it possible to increase the current, if the source voltage error is less than or equal to the lower limit of the predetermined range, then the method selects a control vector which makes it possible to reduce the current.

10. Method according to claim 1, which comprises steps for hysteretic current control, including the following steps:

calculating, for each phase current, a current error, comparing the current error with a hysteresis, the result of the comparison with the hysteresis then being the control for the corresponding phase, the result of the selection which aims to keep the instantaneous voltage error within the predetermined range taking priority over the result of the comparison with the hysteresis.

11. Method according to claim 1, wherein the selection step comprises a step of checking convergence which checks the evolution of the error, if this evolution is, with the current control vector, in the direction of correcting the error, then the control vector remains unchanged.

12. Method according to claim 1, wherein if a number of control vectors are eligible, the method selects by way of priority the one which minimizes the number of switching operations in the inverter, then the one which maximizes the time until the next error appears.

13. Device for carrying out said method according to claim 1, which comprises a voltage inverter which is connected upstream to a DC bus, downstream to an electrical load and also connected to a control logic, the control logic implementing said method and producing control vectors for the inverter.

* * * * *